Figure 1:
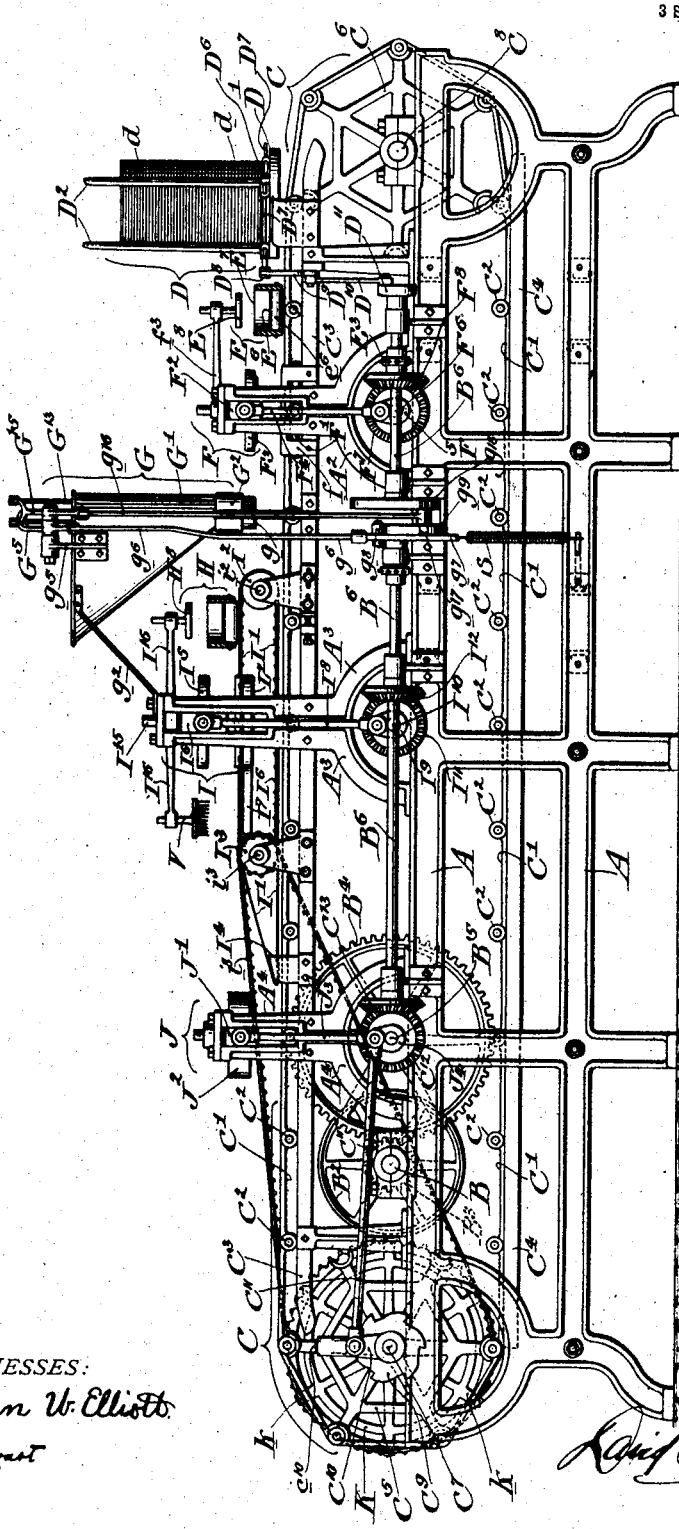

No. 778,295. PATENTED DEC. 27, 1904.
D. S. WILLIAMS.
MACHINE FOR MAKING PIES.
APPLICATION FILED MAY 16, 1904.

3 SHEETS—SHEET 1.

WITNESSES:
Norman V. Elliott
Stewart

INVENTOR.
David S. Williams

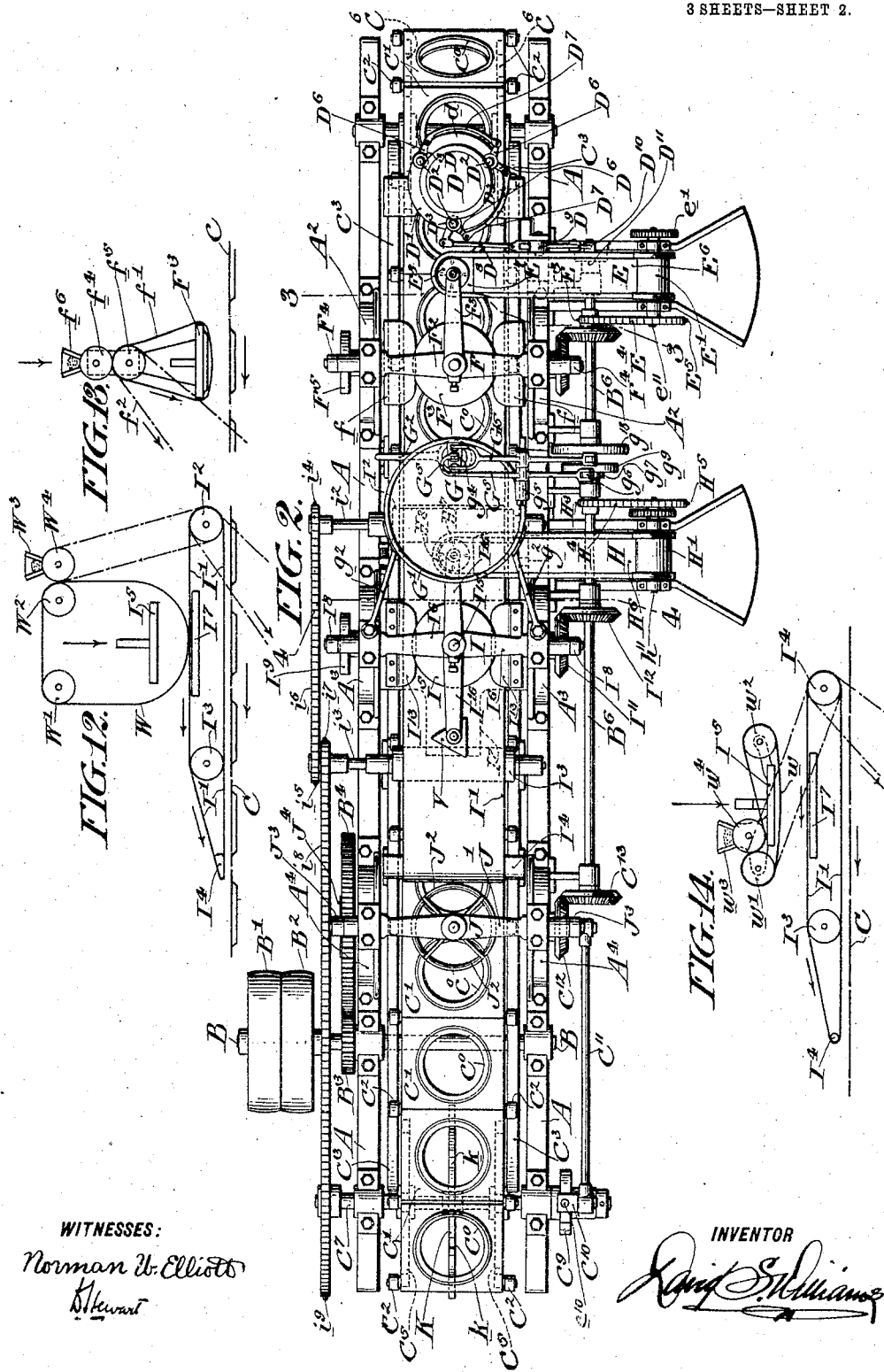

No. 778,295. PATENTED DEC. 27, 1904.
D. S. WILLIAMS.
MACHINE FOR MAKING PIES.
APPLICATION FILED MAY 16, 1904.
3 SHEETS—SHEET 3.
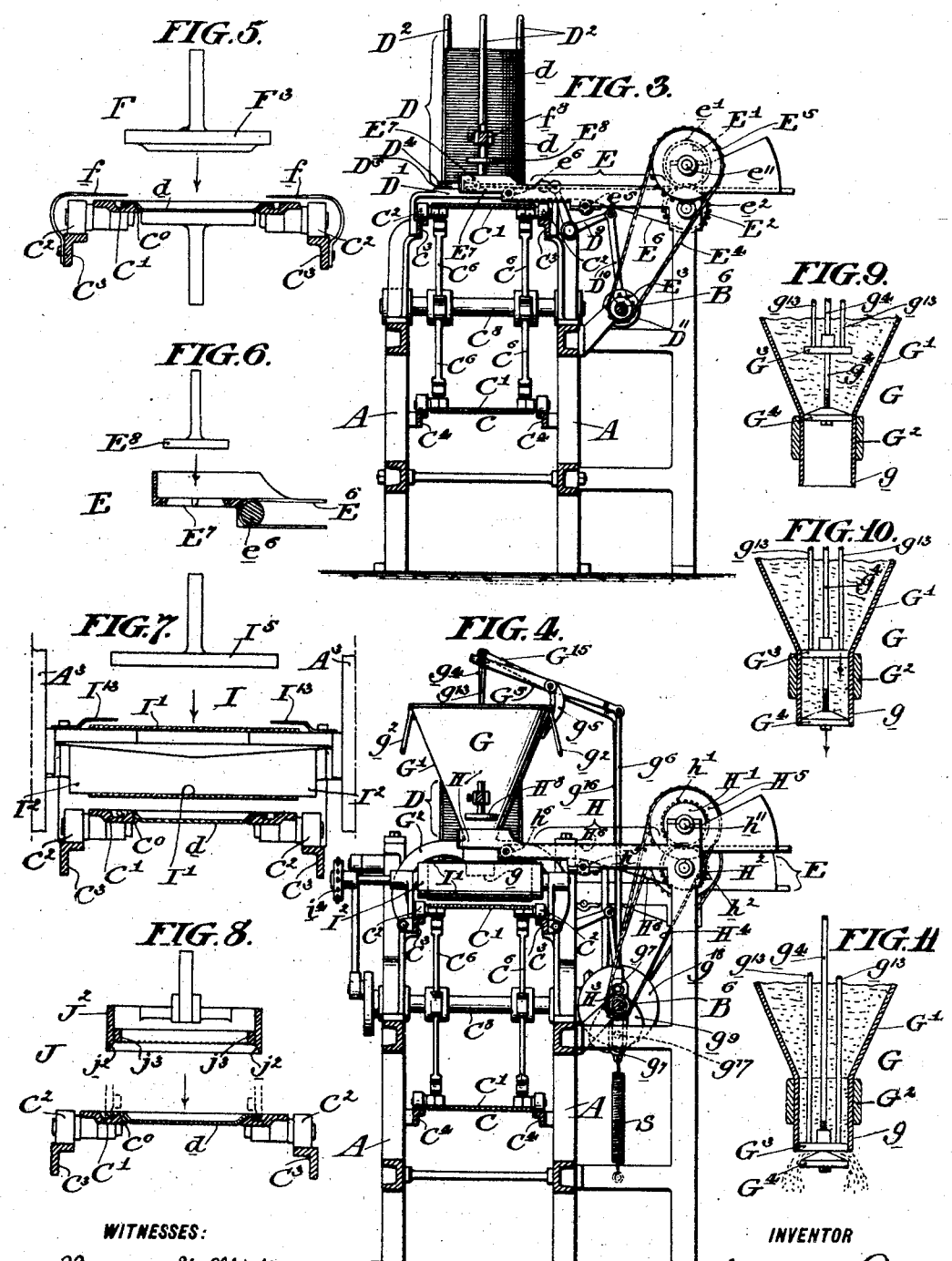
WITNESSES:
INVENTOR No. 778,295. Patented December 27, 1904.

UNITED STATES PATENT OFFICE.

DAVID S. WILLIAMS, OF GLENSIDE, PENNSYLVANIA, ASSIGNOR TO JOSEPH C. HUTCHISON, OF PHILADELPHIA, PENNSYLVANIA.

MACHINE FOR MAKING PIES.

SPECIFICATION forming part of Letters Patent No. 778,295, dated December 27, 1904.

Application filed May 16, 1904. Serial No. 208,164.

*To all whom it may concern:*

Be it known that I, DAVID S. WILLIAMS, a citizen of the United States, residing at Glenside, in the county of Montgomery and State of Pennsylvania, have invented certain new and useful Improvements in Machines for Making Pies, of which the following is a specification.

My invention embodies a machine for making pies in a manner that will not tend to toughen the dough and in which the finished product will be cheaper, more uniform in quality, and shorter in texture, and consequently better, than the product made by the rolling process.

My invention relates to further improvement in Letters Patent No. 740,346, granted to me September 29, 1903.

In carrying out my invention I employ an endless conveyer made up of a number of sections provided with openings to receive the plates. The plates or pans are automatically fed to the conveyer, and each as it passes along is supplied from a dough-feeding mechanism with a thick lump or cake of dough, which is brought under the action of a plunger and is pressed into the shape desired to be given to the lower crust. The crust thus formed is then carried to the filling mechanism, where the requisite amount of fruit or meat is measured and applied to its surface. By the mechanism next employed the top crust is pressed into shape, perforated, and fed by an endless belt to the lower crust, after which the irregular edges are trimmed off and crimped and the product is ready for baking.

The nature of my improvements will be more clearly understood by reference to the accompanying page of drawings, in which—

Figure 1 illustrates a side elevation, with the dough-feeding mechanism broken away, of a machine constructed in accordance with my invention. Fig. 2 represents a plan view of the same. Fig. 3 is a transverse sectional view taken on line 3 3 of Fig. 2. Fig. 4 is a similar transverse section taken on line 4 4 of Fig. 2. Fig. 5 is an enlarged diagrammatic cross-section of a portion of the conveyer mechanism, showing the position of the stripper-plates with respect to the conveyer and plunger. Fig. 6 is a similar cross-section of the end of dough-feed for the lower crust, showing the manner in which the cakes are pressed from a thick sheet and delivered to the pie-plates. Fig. 7 is a view similar to Fig. 5 of the top-crust-forming mechanism and stripper-plates for releasing the dough from the plunger. Fig. 8 is a diagrammatic cross-section, enlarged, of the trimming and crimping ring, showing its relation to the conveyer. Fig. 9 is a diagrammatic section, enlarged, of the lower end of the hopper for containing the filler, showing the plungers in a receiving position. Fig. 10 is a similar view with the plungers in a position near the point of delivery. Fig. 11 is a similar view showing the plungers in a position to discharge a measured amount of filler. Fig. 12 shows a diagram of a modified form of stripping mechanism in which a loose belt adapted to be coated with flour is passed between the plunger and the conveyer of the top-crust-forming mechanism. Fig. 13 shows a diagrammatic modification of a belt adapted to be coated with flour mounted upon and carried by the plunger, and Fig. 14 shows a further modification of a stripper for the top-crust-forming mechanism in which a coated belt is mounted upon and carried by the plunger.

Referring in general to the reference-letters of the drawings, A denotes the frame of the machine; B, the main driving-shaft; C, the endless conveyer; D, the plate-feeding mechanism; E, the dough-feeding mechanism; F, the lower-crust-forming mechanism; G, the filler mechanism; H, the upper-crust-dough-feeding mechanism; I, the upper-crust-forming mechanism, and J the mechanism for trimming and crimping the crusts.

Considering the parts in detail, the main driving-shaft B is provided, respectively, with fast and loose driving-pulleys $B'$ and $B^2$ and with a small gear-wheel or pinion $B^3$, which meshes with a gear-wheel $B^4$, mounted on a shaft $B^5$.

The endless conveyer C is made up of a number of links $C'$, which are hinged together and have at this point rollers C², which rest upon rails C³ and C⁴ during the greater part of their travel and are carried at each end of the machine by sprocket-wheels C⁵ and C⁶, mounted upon shafts C⁷ and C⁸. The shaft C⁷, by which the conveyer C is driven, is provided with a ratchet-wheel C⁹, operated by a lever C¹⁰, which is fulcrumed upon the shaft C⁹ and carries a spring-actuated pawl c¹⁰ to engage the above-mentioned ratchet-wheel. The lever C¹⁰ is connected to a rod C¹¹, operated by a crank on the bevel-gear C¹² on the shaft B⁵. The links or sections C' of the conveyer are each provided with an opening C⁰, cut out in such a manner as to closely embrace and form an outer wall for the plates to be deposited therein, as well as to form a ledge to engage the top flange of the plate.

The plate-feeding mechanism D comprises a base-plate D', from which project guides or uprights D², between which the plates d are supported. Each guide is provided with an escapement-ring D³, which has two mutilated rings D⁴ and D⁵, arranged in such a manner that the upper ring will engage the rim of the plate adjacent to the one at the bottom before the lower ring releases its hold upon the lower plate and it is allowed to drop to the conveyer C. Further details of this part of the apparatus will be found in Letters Patent which I have previously referred to. The rings D³ have united to them levers D⁶, which are joined together by connecting-rods D⁷, the last lever of the series being connected by a rod D⁸ to a bell-crank lever D⁹, which is operated by a connecting-rod D¹⁰ and a crank-disk D¹¹, which latter is mounted upon a shaft B⁶.

The conveyer C after receiving a plate is carried forward one step and the plate is then supplied with a thick cake of dough of considerably less diameter than the crust it is to form by the dough-feeding mechanism E. This mechanism comprises a set of feed-rolls E' and E², operated in unison by gears e' and e² and driven from the shaft B⁶ by a sprocket-wheel E³, chain E⁴, and sprocket-wheel E⁵, the first-mentioned sprocket-wheel being mounted upon the shaft B⁶ and the latter-mentioned one being secured to a shaft e¹¹, supporting the roll E'. The lower roll is provided with a belt E⁶, which passes around small rolls e⁵ and e⁶ in discharging dough to cutter E⁷, where it is forced through by a plunger E⁸ to a plate in the conveyer C. The conveyer is then moved forward another step and the cake of dough is brought under the action of the lower-crust-forming mechanism F. This mechanism comprises supporting-frames A², between which is firmly supported a bed-plate F', arranged in line with the bottom of the plate d, and a cross-head F², carrying a plunger F³, which latter is of the same contour as the plate. The cross-head F² is guided in the upper part of the frame A² and is operated by connecting-rods F⁴, studded to cranks F⁵, which are firmly mounted upon a shaft F⁶. One of the cranks F⁵, as shown in Fig. 1, is formed by the face of a bevel-gear F⁷, which is driven by the shaft F⁶ by meshing with a corresponding gear-wheel F⁸, mounted on the shaft B³. The plunger F³ carries an arm f³, to which is attached the smaller plunger E⁸. The method of pressing the dough into the plate d to form the lower crust as distinguished from the method of rolling out a sheet of dough and then placing it upon the plate has distinct advantages, for aside from being a quicker operation it has the advantage of producing a shorter crust, or, in other words, a crust which when baked is exceedingly light and tender. In the course of my experiments this method was at first attended with difficulties, due to the tendency of the pie-dough, which is very sticky, to adhere with great tenacity to the upper die or plunger. In my former application I showed and described a method of overcoming this by means of a heated plunger; but as this method is somewhat slow in its operation I much prefer the following devices for accomplishing the same result: On both sides of the machine, fastened to the rails C³, are spring-plates f f, which I call "stripper-plates," for the reason that when the plunger descends the cake of dough is spread out in a sheet and forced under these plates, so that as the plunger rises these plates strip or peel off the dough from the plunger more expeditiously than it can be accomplished by means of a heated plunger.

As an alternative form of stripper mechanism I have shown in diagram Fig. 13 in lieu of the interposing plates an interposing belt f', which is carried around the plunger F³ and fed between rollers f⁴ and f⁵. One of these rollers, preferably the roller f⁵, may be operated from any suitable part of the machine by a belt f², and the other of the rollers, preferably the roller f⁴, is provided with a flour-hopper f⁶, which imparts a thin layer of flour to the roller f⁵, which in turn transfers it to the belt f'.

The next operation is performed by the filling mechanism G, which comprises a hopper G', mounted upon a bracket G² and braced by stay-rods g² g². The mouth g of the hopper is provided with plungers G³ and G⁴, through the joint action of which a measured amount of filler is drawn in, carried downward, and forced out upon a crust placed in proper position to receive it. The plunger G⁴ is connected to a rod g⁴, which passes through the plunger G³ and at the top is connected to one end of a lever G⁵, fulcrumed at or near its center to a bracket g⁵. The other end of the lever G⁵ is connected to a rod g⁶, having at the bottom a plate g⁷, slotted to straddle the shaft B⁶. This plate is furnished with a roller g⁸, operated in one direction by a cam g⁹ and in the opposite direction by a spring S. The plunger $G^3$ is connected to rods $g^{13}$ $g^{13}$, which pass upward and are connected to the forked ends of a lever $G^{15}$, also fulcrumed to the bracket $g^5$. The opposite end of the lever $G^{15}$ is connected to a rod $g^{16}$, the lower end of which is journaled upon a crank-pin $g^{17}$, located between the cam $g^9$ and a crank-disk $g^{18}$, mounted upon the shaft $B^6$. The several positions which the plungers $G^3$ and $G^4$ successively occupy during the operation of the machine are illustrated by diagrams in Figs. 9, 10, and 11. The first of the series of diagrams shows the plunger $G^4$ resting momentarily at the extremity of its upward movement and the plunger $G^3$ still rising to draw in the requisite amount of filler. The next position shows the plungers traveling downward with a measured amount of filler, and the last position shows the plungers at the extreme end of their downward movement discharging the filler. Following the filler mechanism comes the dough-feeding mechanism H for the top crust. This is in all respects like the feeding mechanism E, comprising feed-rolls $H'$ and $H^2$, operated in unison by gears $h'$ and $h^2$ and driven from the shaft $B^6$ by a sprocket-wheel $H^3$, chain $H^4$, and sprocket-wheel $H^5$. The first-mentioned sprocket-wheel is mounted upon the shaft $B^6$, and the last-mentioned one is secured to a shaft $h^{11}$, supporting the roll $H'$. The lower roll is provided with a belt or apron $H^6$, which passes around small rolls $h^5$ and $h^6$, to carry a sheet of dough to cutter $H^7$, where the dough is forced through the cutter by a plunger $H^8$ onto a belt or apron $I'$, where it is conveyed to the top-crust-forming mechanism. The top-crust-forming mechanism I includes the belt or apron $I'$, which is carried by rollers $I^2$ and $I^3$, and an end plate $I^4$. These rollers are mounted, respectively, on shafts $i^2$ and $i^3$, which are suitably journaled and provided with sprocket-wheels $i^4$ and $i^5$, connected by a sprocket-chain $i^6$. The shaft $i^3$ is also provided with a sprocket-wheel $i^7$, which through the medium of a sprocket-chain $i^8$ and large sprocket-wheel $i^9$ receives motion from the shaft $C^7$. The top-crust-forming mechanism also embodies a crust-forming plunger $I^5$, secured to a cross-head $I^6$, which is guided in frames $A^3$ $A^3$, fastened to the body of the machine. Fastened between the frames $A^3$, directly below the belt or apron $I'$, is a bed-plate $I^7$, which serves to sustain the belt or apron when the cake of dough is being pressed. The cross-head $I^6$, which carries the plunger $I^5$, is provided with connecting-rods $I^8$ $I^8$, operated by cranks $I^9$ $I^9$, mounted upon a shaft $I^{10}$, one of which is connected to and forms part of a bevel-gear $I^{11}$, which gear imparts a rotary motion to the shaft $I^{10}$ by meshing with a corresponding bevel-gear $I^{12}$, mounted on the shaft $B^6$. The plunger $I^5$ has a central stem $I^{15}$, which extends through and is firmly fastened to the cross-head $I^6$. To the stem $I^{15}$ is fastened a two-armed bracket $I^{16}$, to one of the arms of which is fastened the plunger $H^8$ and to the other a marking-plate V, which latter marks the crust with a suitable letter denoting the kind of filler contained in the finished product.

Fastened to the bed-plate $I^7$, below the plunger $I^5$, are stripper-plates $I^{13}$ $I^{13}$, which during the pressing of the crust receive and overlap a portion of the outer edge of the crust, so that as the plunger is withdrawn these plates will strip or peel off the dough from the plunger and allow it to remain on the belt or apron $I'$. As alternative forms of stripping devices I have illustrated two modifications, Figs. 12 and 14, in the former of which I employ a loose belt or apron W, carried by rollers $W'$ and $W^2$, with a hopper $W^3$ and roller $W^4$ to supply a thin layer of flour to the belt or apron W. In the latter case, Fig. 14, the same general plan is carried, except that belt $w$, rollers $w'$ $w^2$ $w^4$, and hopper $w^3$ are all secured to and carried by the plunger and move up and down during the pressing operation, as in diagram Fig. 13. The belt or apron $I'$ at the forward end of the machine passes over a smoothly-rounded end plate $I^4$, which is brought down into close proximity with the plate-conveyer C, so that the top crust will be led away from its belt or apron $I'$ by the movement of the plate-conveyer $C'$ and the lower crust which it carries.

The final operation consists in trimming off and scalloping the edges of the top crust, which is accomplished by the following mechanism: Guided in frames $A^4$ $A^4$ is a cross-head $J'$, which carries a wheel $J^2$. This wheel is made in two parts, having an outer flange $j^2$, tapered at the bottom so as to bear against the edge of the plate, and thereby trim the edges of the crust, and an inner ring $j^3$, which is crimped or otherwise fashioned to ornament the outer edge of the crust. A further object of the crimping is to unite the upper and the lower crusts firmly together. The cross-head $J'$ is fulcrumed to rods $J^3$ $J^3$, which are connected at their lower ends to cranks $J^4$ $J^4$, mounted on the shaft $B^5$. One of these cranks is connected to and forms part of the bevel-wheel $C^{12}$, which meshes with a corresponding gear $C^{13}$, mounted upon the shaft $B^6$.

The shaft $C^7$ is provided centrally with a wheel K, which has about its periphery a number of projections $k$. These projections enter the openings in the conveyer $C'$ and serve to lift the pie-plate and its contents as it reaches the end of the machine, enabling the plate to be more readily taken from the conveyer.

Having described my invention, what I claim, and desire to secure by Letters Patent, is—

1. A machine for making pies, comprising in combination with a crust-forming mechanism, a filler mechanism comprising a hopper provided at the bottom with a discharge-opening and two independently-operated plungers adapted to receive a charge of filler from the hopper and by their joint action forcibly discharge the same, substantially as specified.

2. A machine of the character specified, comprising a plate-conveyer mechanism, a crust-forming mechanism, and a stripper mechanism comprising two horizontally-disposed plates secured to the frame of the machine on either side of the crust-forming mechanism and projecting some distance over the conveyer mechanism, substantially as specified.

3. A machine for making pies, comprising an endless conveyer formed of a number of linked members provided with openings to hold pie-plates, means for operating the conveyer, a mechanism for supporting a number of plates and for delivering the same one at a time to the conveyer members, a plunger mechanism adapted to act with a plate in the conveyer to form the bottom crust, a reservoir and filler mechanism to supply and deliver a filler to the lower crust, a mechanism to press a top crust, and a belt to convey the top crust to the bottom crust, substantially as described.

4. A machine of the character specified, comprising a plate-conveyer mechanism, a crust-forming mechanism, a stripping device comprising two stationary guides arranged to overhang and prevent the lifting of a plate and its contents from the conveyer by the action of the crust-forming mechanism, a filler mechanism, a second crust-forming mechanism and an endless belt to convey and deposit one crust upon another, substantially as specified.

5. A machine for making pies, comprising an endless conveyer mechanism composed of members fitted to receive pie-plates and to cause the members to operate with an intermittent motion, a mechanism for holding a number of pie-plates and for delivering them one at a time to the conveyer members, a plunger mechanism adapted to coact with a plate in the conveyer to form the lower crust, a stripping device, a reservoir and filler mechanism to supply and to deliver fruit to the lower crust, and a mechanism to press an upper crust, an endless belt to deliver the upper crust to the pie, substantially as described.

6. A machine for making pies, comprising an endless conveyer composed of members fitted to receive pie-plates, a mechanism for holding a number of pie-plates and for delivering them one at a time to the conveyer, a mechanism for supplying the plates carried by the conveyer with dough, a plunger mechanism adapted to coact with a plate to form the lower crust of the pie, a stripper mechanism, a reservoir and filler mechanism to supply and deliver a filler to the pie-crust, a mechanism to form and perforate the top crust, an endless conveyer to deliver the top crust and a mechanism for trimming the edges of the crusts, substantially as specified.

7. A machine for making pies, comprising an endless conveyer fitted to receive pie-plates, a mechanism for supporting and delivering plates to the conveyer, a mechanism for feeding the crust-making material, a plunger mechanism adapted to form a pie-crust within the plate delivered to the conveyer, a stripper mechanism, a reservoir and filler mechanism to supply and deliver a filler to the crust, a mechanism to feed material to form a top crust, a mechanism to form a top crust, a stripper mechanism, a second conveyer mechanism and a mechanism to cut and trim the edges of both of the crusts, substantially as described.

8. A machine for making pies, comprising an endless conveyer fitted to receive pie-plates, a plate-delivery mechanism, a dough-feeding mechanism, a dough-cutting mechanism for the same, a plunger mechanism to form the lower crust, a stripper mechanism, a reservoir and filler mechanism, a mechanism to feed material to form a top crust, a dough-cutting mechanism for the same, a mechanism to press, perforate and deliver a top crust to the pie, a stripping device for the plunger of said mechanism and a mechanism for trimming the edges of the crusts, substantially as specified.

9. A machine of the character specified, comprising in combination, a plate-carrying mechanism, plates fitted thereto forming the lower die of a crust-forming mechanism, a reciprocating plunger forming the upper die of a crust-forming mechanism, an interposing stripper between the plates and the plunger, an endless belt forming the lower die of a second crust-forming mechanism, a reciprocating plunger arranged above the same forming the upper die of the second crust-forming mechanism, and an interposing stripper arranged between the endless belt and the plunger, substantially as described.

10. A filler mechanism for pie-machines, comprising a hopper provided at the bottom with a discharge-pipe, plungers working in said pipe, each of which is independently operated and so arranged that a quantity of filler will be drawn in between the plungers, carried down through the discharge-pipe, and forcibly ejected by the plungers moving together and closing the space between them, substantially as shown and described.

In testimony whereof I affix my signature in presence of two witnesses.

DAVID S. WILLIAMS.

Witnesses:
NORMAN W. ELLIOTT,
ARNOLD KATZ.